United States Patent [19]

Law et al.

[11] Patent Number: 4,492,750
[45] Date of Patent: Jan. 8, 1985

[54] ABLATIVE INFRARED SENSITIVE DEVICES CONTAINING SOLUBLE NAPHTHALOCYANINE DYES

[75] Inventors: Kock-Yee Law, Fairport; Gordon E. Johnson; John W. P. Lin, both of Webster, all of N.Y.

[73] Assignee: Xerox Corporation, Stamford, Conn.

[21] Appl. No.: 541,592

[22] Filed: Oct. 13, 1983

[51] Int. Cl.$^3$ .................. G03C 5/04; G03C 1/76
[52] U.S. Cl. .................. 430/494; 430/495; 430/945; 430/269; 430/270; 430/276; 430/278; 430/523; 430/526; 346/135.1; 346/76 L
[58] Field of Search .............. 430/495, 494, 945, 269, 430/270, 276, 278, 523, 526; 346/135.1, 76 L

[56] References Cited

U.S. PATENT DOCUMENTS

| | | | |
|---|---|---|---|
| 3,465,352 | 9/1969 | Carlson et al. | 346/76 |
| 4,223,062 | 9/1980 | Hession | 428/216 |
| 4,230,939 | 10/1980 | de Bont et al. | 235/488 |
| 4,241,355 | 12/1980 | Bloom et al. | 346/135.1 |
| 4,298,975 | 11/1981 | Van Der Veun | 369/94 |
| 4,364,986 | 12/1982 | Zwanenburg et al. | 428/156 |

*Primary Examiner*—Won H. Louie
*Attorney, Agent, or Firm*—E. O. Palazzo

[57] ABSTRACT

Disclosed is an ablative infrared-sensitive optical recording composition containing as a component thereof a dispersion of a resinous binder and a soluble naphthalocyanine of the following formula:

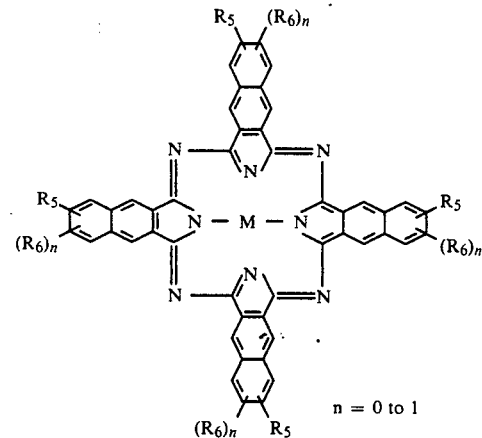

wherein $R_5$ and $R_6$ are independently selected from hydrogen and alkyl groups containing from about 4 carbon atoms to about 8 carbon atoms, and M is two hydrogen atoms, a divalent, trivalent, or tetravalent metal complex.

16 Claims, 1 Drawing Figure

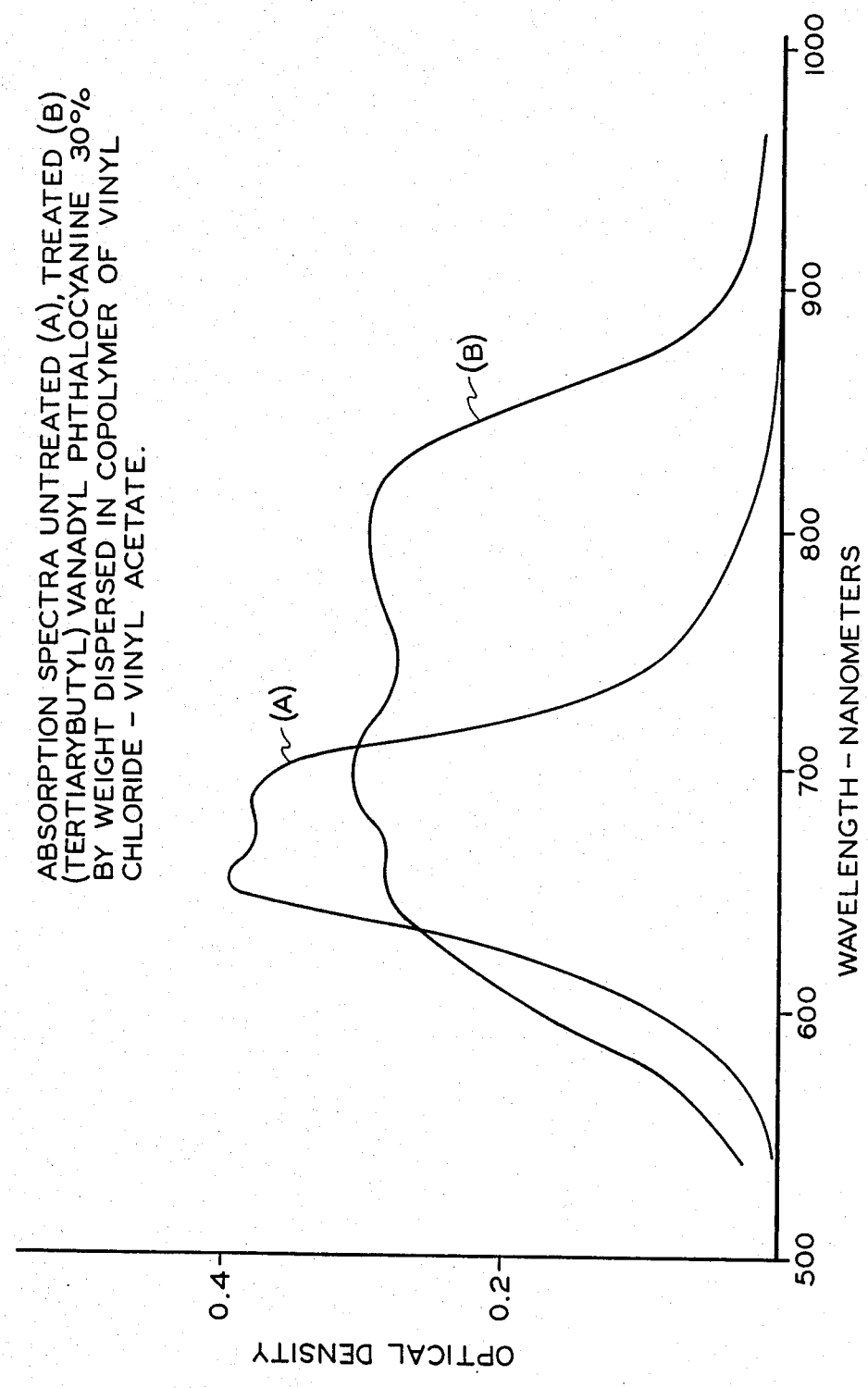

ABLATIVE INFRARED SENSITIVE DEVICES CONTAINING SOLUBLE NAPHTHALOCYANINE DYES

This invention is generally directed to ablative infrared sensitive optical recording devices, and more specifically, the present invention is directed to the use of certain soluble naphthalocyanine dyes in infrared optical recording devices. These optical recording devices, which are generally useful with solid state injection lasers, such as aluminum, gallium, arsenide laser systems, contain the infrared naphthalocyanine dyes of the present invention, dispersed in various polymeric resinous binder compositions.

Ablative optical recording devices are known, thus, for example, there is described in U.S. Pat. No. 4,241,355 an ablative recording medium comprising a light reflecting layer and a light absorbing layer. This layer which absorbs light at from about 750 to 850 nanometers is comprised of a phthalocyanine pigment of the formula as shown in Column 2, wherein X is hydrogen or chlorine, and M is selected from the group consisting of lead aluminum, vanadyl, or tin. Examples of specific pigments disclosed for use in the recording medium described include lead phthalocyanine, chloroaluminumphthalocyanine, vanadyl phthalocyanine, stannic phthalocyanine, or chloro aluminum chloro phthalocyanine. According to the disclosure of this patent these phthalocyanine compounds all absorb energy at solid state injection laser wavelengths and thus all can be evaporated onto a light reflecting layer to produce smooth, optical quality light absorption layers that form recorded information having high signal-to-noise ratios. The optical recording media disclosed in this patent were prepared by placing a reflective substrate in a vacuum chamber and causing, for example, the phthalocyanine such as lead phthalocyanine to be vacuum evaporated thereon.

There is described in U.S. Pat. No. 4,298,971 an optical recording medium wherein the recording layer consists entirely, or substantially entirely, of a compound of a metal oxide, or metal halide phthalocyanine, vacuum vapor deposited onto a substrate with or without a thin film of chalcogenide of tellurium. Examples of suitable phthalocyanines disclosed include vanadyl phthalocyanine, tin phthalocyanine, nickel phthalocyanine, aluminum phthalocyanine, zinc phthalocyanine, platinum phthalocyanine, and the like.

Additionally, there is disclosed in U.S. Pat. No. 4,219,826 an optical recording medium wherein the recording layer contains platinum complexes of bis(-dithio-alpha-diketones). Moreover, there is disclosed in an article appearing in the Journal of Vacuum Science Technology, Vol. 18, page 105, (1981), and in the IBM Technical Disclosure Bulletin, Vol 24, page 298, (1981), optical recording media wherein the recording layer contains squarylium dyes. These devices are sensitive in the near infrared region of the spectrum. However, the primary recording element is a solid thin film of dyes or pigments which have undesirable, poor mechanical properties and, furthermore, such devices are costly to fabricate since vacuum deposition techniques are selected for the preparation thereof. Additionally, these devices age and the dye materials used tend to recrystallize during storage, which causes a decrease in the signal-to-noise ratio of the read-out, and, also, undesirably modifies the writing characteristics of the devices involved.

Optical recording members containing organic dyes dispersed or dissolved in polymeric resinous binders are disclosed in U.S. Pat. No. 3,465,352; U.S. Pat. No. 4,139,853; and in Applied Physics Letters, Vol. 36, pages 884-885, (1980). More specifically, U.S. Pat. No. 3,465,352 discloses the use of triphenylmethane dyes in a cellulose nitrate resinous binder wherein photobleaching is selected as the vehicle for laser writing. A number of disadvantages are associated with photobleaching including fading of the optical disc involved during storage, and unwanted writing may occur during read-out by another laser beam. While dye-polymer systems are disclosed in U.S. Pat. No. 4,139,853, the dyes involved are not sensitive in the near infrared region of the spectrum, that is, from about 750 nanometers to 850 nanometers.

Additionally, there is disclosed in U.S. Pat. No. 4,230,939 optical recording devices containing an auxiliary layer of an organic dye dispersed in a suitable resinous binder. Examples of dyes disclosed in this patent include Rhodamines, triphenylmethane, crystal violet, cyanine, chromogenic dyes, and the like, while examples of resinous binders disclosed include polystyrenes, polyesters, polyacrylates, and copolymers of vinylchloride and vinylacetate. The Rhodamines, the triphenylmethane, and crystal violet dyes are, however, non-absorbing in the near infrared region of the spectrum, and therefore are not useful with gallium arsenide diode laser systems. While several of the cyanine and chromogenic dyes are known to be sensitive in the near infrared region of the spectrum, these dyes are of low thermal and photo stability and thus are not suitable for archival storage purposes.

Furthermore, disclosed in Applied Physics Letters, Vol. 39, November 1981, No. 9, page 718, are infrared sensitive organic materials useful for optical recording, which materials contain a carbocyanine dye dispersed in a polymeric composition. According to the disclosure of this article, dye in polymer films of various thicknesses were spin coated onto aluminized glass substrates under a wide range of process parameters. The devices prepared had a reflectivity at 835 nanometers of about 30 percent with a film thickness of 105 nanometers. The anti-reflecting condition of this device enhances the absorption of the films by a factor of about 2, which according to the articles is significant for both writing sensitivity and read-out contrast. This article also discloses the use of gallium arsenide diode laser devices.

Also disclosed in U.S. Pat. No. 4,364,986, are information recording elements for optically recording readable information thereon comprised of a disc shaped substrate containing as a recording layer a mixture of a dye and a copolymer of methylvinylether and maleic anhydride or a semi-ester of a copolymer of methylvinylether and maleic anhydride and an aliphatic alcohol, reference the disclosure in Column 2, beginning at line 17. According to the disclosure of this Patent, reference Column 4, beginning at line 51, subsequent to exposing the recording element to pulsed laser light, permanent chemical or physical changes are introduced into the recording layer which can be read by means of the laser light which is considerable weaker than the recording laser light.

While the above optical recording devices may be suitable for their intended purposes, there remains a need for improved optical recording devices. More specifically, there remains a need for ablative optical recording devices which are sensitive to infrared radiation, that is, energy of a wavelength ranging from about 750 nanometers to 900 or more nanometers. Additionally, there remains a need for new dyes and pigments which can be useful in optical recording members sensitive to infrared radiation. Further, there continues to be a need for optical recording members which can be easily fabricated, for example, by solvent coating techniques thereby resulting in optical devices containing dyes and/or pigment particles of a size less than 0.1 microns rendering them highly useful for their intended purposes. Also, there continues to be a need for optical recording members which are thermally, photochemically, and structurally stable, rendering these devices highly useful for archival storage. Moreover, there continues to be a need for optical recording members sensitive to infrared radiation which are comprised of tertiary butyl substituted vanadyl phthalocyanine dye dispersed in resinous materials, or certain naphthalocyanine dyes dispersed in resinous binder materials. Additionally, there is a need for optical recording devices which will be useful with gallium aluminum arsenide laser systems.

SUMMARY OF THE INVENTION

It is an object of the present invention to provide ablative recording members which overcome the above-noted disadvantages.

In another object of the present invention, there are provided optical recording members which will absorb wavelength energy in the near infrared region of the spectrum.

In a further object of the present invention, there are provided optical recording members which are highly useful with solid state laser diodes such as gallium aluminum arsenide laser devices.

In still a further object of the present invention, there are provided optical recording members which can be desirably fabricated by solvent coating processes.

In another object of the present invention, there are provided ablative optical recording members containing dispersions of certain phthalocyanine dyes in resinous binder compositions.

In yet in another object of the present invention, there are provided ablative optical recording members containing dispersions of naphthalocyanine dyes in resinous binder compositions.

These and other objects of the present invention are accomplished by the provision of ablative optical recording devices sensitive to infrared radiation containing as a component thereof known naphthalocyanine dyes dispersed in resinous binder compositions. The infrared absorbing ablative optical recording devices envisioned are generally comprised of a supporting substrate, preferably a reflective substrate, and a layer thereover comprised of a resinous binder having dispersed therein soluble tertiary butyl substituted vanadyl phthalocyanine dyes, the claimed subject matter of a copending application, and known soluble naphthalocyanine dyes, of the following formula:

I. Soluble tertiary butyl substituted vanadyl phthalocyanine dyes:

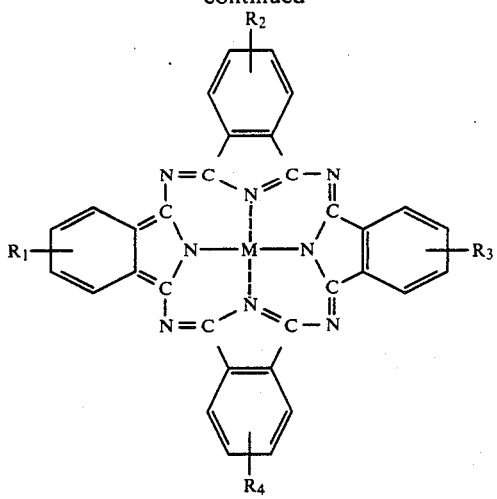

-continued

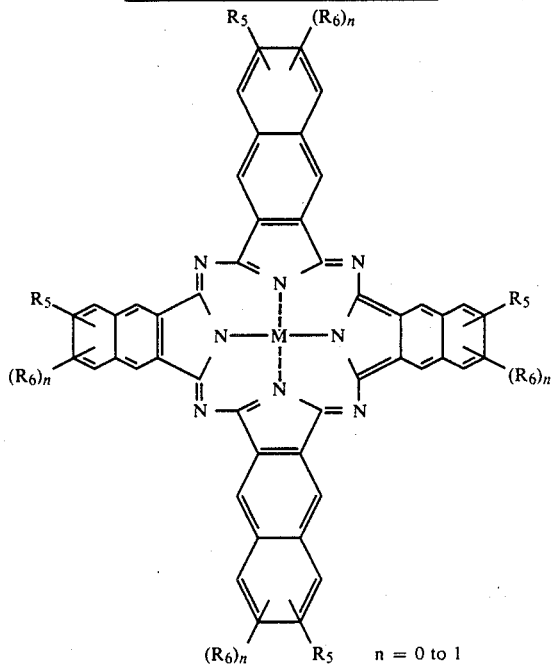

II. Soluble naphthalocyanine dyes:

n = 0 to 1 wherein $R_1$, $R_2$, $R_3$, and $R_4$, are independently selected from hydrogen, and tertiary butyl groups, $R_5$, and $R_6$, are independently selected from hydrogen and branched or long chain alkyl groups containing from about 4 carbon atoms to about 20 carbon atoms, and preferably from about 4 carbon atoms to about 10 carbon atoms, such as tertiary butyl groups, and M is two hydrogen atoms, or divalent, trivalent, and tetravalent metal complexes, such as vandium oxide, cadmium, copper, zinc, hydroxy aluminum, cobalt, dichlorotin, maganese, palladium, nickel, and the like, a metal, metal halide, and/or metal oxide, wherein the average number of tertiary butyl groups, $R_1$, $R_2$, $R_3$, and $R_4$ are from about 1 to 2.5. While it is not desired to be limited by theory, it is believed that the R substituent groups present on the phthalocyanine composition allows the resulting material to be solubilized, thus providing desirable solvent coating processes for preparing optical recording members containing as components thereof the phthalocyanines described.

Illustrative examples of M substituents as indicated herein, include vanadium oxide, chloro aluminum, tin, lead and the like, while illustrative examples of R substituents for the naphthalocyanine include alkyl groups such as butyl, pentyl, hexyl, octyl, decyl. and the like. Also, the R substituent can include the trimethylsilyl group, alkylsulfonamido groups, alkoxy groups, or alkyl halide groups.

Ablative infrared sensitive optical recording devices containing the phthalocyanines of the present invention are useful for recording information which involves exposing the devices to laser light modulated in accordance with the information to be processed. More specifically, the ablative optical recording devices are exposed to laser light with an emission wavelength of from about 750 nanometers to about 900 nanometers or more, causing pits or holes to be formed in the absorbing layer comprised of the naphthalocyanine components, dispersed in resinous binders, which information can be read in reflection by means of a laser light. The known economical solid state lasers are preferably used, such as the gallium aluminum arsenide lasers which generally have power of 1 to 50 milliwatts and be modulated at pulse lengths of from about 0.001 to about 1 microsecond.

Specific illustrative examples of phthalocyanine and naphthalocyanine dyes or pigments embraced by the above-identified formula include tertiary butyl substituted vanadyl phthalocyanines, tertiary butyl substituted chloro aluminum phthalocyanine, tertiary butyl substituted lead phthalocyanine, tertiary butyl substituted tin phthalocyanine, tetra-tertiary butyl vanadyl naphthalocyanine, tetra-tertiary butyl metal-free naphthalocyanine, tetra-tertiary butyl copper naphthalocyanine, tetra-tertiary butyl zinc naphthalocyanine, tetra-tertiary butyl dichloro tin naphthalocyanine, tetra-tertiary butyl manganese naphthalocyanine, tetra-tertiary butyl cobalt naphthalocyanine, tetra-tertiary butyl nickel naphthalocyanine, tetra-tertiary butyl palladium naphthalocyanine, and the like. The preferred dyes are tetra-tertiary butyl vanadyl naphthalocyanine.

The average number of tertiary butyl groups contained on the novel tertiary butyl vanadyl phthalocyanine compositions were characterized by elemental analysis for carbon, hydrogen, and nitrogen, followed by confirmation with NMR analysis, and mass spectrometric analysis. Specifically, for example, for a tertiary butyl vanadyl phthalocyanine composition containing an average of $2.0 \pm 0.7$ tertiary butyl groups, elemental analysis revealed 68.88 percent carbon, 4.99 percent hydrogen, and 15.59 percent nitrogen. From this analysis, it was calculated that the average number of tertiary butyl groups on the phthalocyanine ring was 2.0 plus or minus 0.7. The elemental analysis numbers were then confirmed by NMR analysis. Subsequently, mass spectrometic analysis indicated the following percentages:

| | |
|---|---|
| Tertiary butyl vanadyl phthalocyanine | 55.2% |
| Di-Tertiary butyl vanadyl phthalocyanine | 32.7% |
| Tri-Tertiary butyl vanadyl phthalocyanine | 12.1% |

Similarly, elemental analysis for the novel vanadyl phthalocyanine containing 1.4 plus or minus 0.7 tertiary butyl groups revealed 67.75 percent carbon, 4.05 percent hydrogen, and 60.96 percent nitrogen. From this analysis, it was calculated that the average number of tertiary butyl groups on the phthalocyanine ring was 1.4 plus or minus 0.7. The elemental analysis numbers were confirmed by NMR analysis. Subsequently, mass spectrometric analysis revealed the following:

| | |
|---|---|
| Tertiary butyl vanadyl phthalocyanine | 70% |
| Di-Tertiary butyl vanadyl phthalocyanine | 24.8% |
| Tri-Tertiary butyl vanadyl phthalocyanine | 5.2% |

With regard to the known tertiary butyl naphthalocyanines illustrated, the claimed subject matter of the present application, preferred are those containing 4 or 8 tertiary butyl groups.

The known naphthalocyanines can be prepared as described, for example, in Zh. Obshch Khim, Vol. 42, pages 696–699, (1972), while the tertiary butyl substituted vanadyl phthalocyanines, which are novel compositions of matter, are prepared by reacting at a molar ratio of from 1 to about 15, 4-tertiary-butyl phthalonitrile, and phthalonitrile in the presence of an effective amount, about a 1:1 molar ratio, of vanadium trichloride, or vanadium pentoxide, the reaction occurring at a temperature of from about 150° C. to 275° C. After from about 2 to about 4 hours, the resulting solid precipitate was successively boiled with dilute aqueous hydrochloric acid, and dilute aqueous sodium hydroxide solution. The soluble component, which contains the tertiary butyl vanadyl phthalocyanine product was then purified chromatographically, and the resulting material exhibited excellent solubility in organic solvents such as chlorinated solvents, including methylene chloride and that 10 to 20 milligrams of this material dissolved in 1 milliliter of solvent. The resulting tertiary butyl vanadyl phthalocyanine formula and structure was determined by elemental analysis for carbon, hydrogen and nitrogen, and confirmed by proton NMR spectroscopy.

Additionally, the number of tertiary butyl groups contained on the vanadyl phthalocyanine was calculated as illustrated hereinbefore from elemental analysis, and confirmed by proton NMR spectroscopy and mass spectrometric analysis. Also, when the molar ratio of tertiary butyl phthalonitrile to phthalonitrile is approximately 1 to 11, the resulting vanadyl phthalocyanine contains an average of 1 to 1.4 tertiary butyl groups on the vanadyl phthalocyanine ring. Mass spectrometric data indicates that the resulting vanadyl phthalocyanine contains mainly mono-tertiary vanadyl phthalocyanine, with some di-tertiary-butyl vanadyl phthalocyanine and a small amount of tri-tertiary-butyl vanadyl phthalocyanine. The resulting tertiary butyl vanadyl phthalocyanines prepared in accordance with the process described exhibited strong visible absorption in organic solvents, maximum absorption being at about 695 nanometers, and a molar absorption coefficient exceeding $10^5 \text{ cm}^{-1}\text{M}^{-1}$.

The solid state properties of the tertiary butyl substituted vanadyl phthalocyanine are substantially equivalent to vanadyl phthalocyanine as determined by X-ray power diffraction analysis and solid state absorption analysis.

Thereafter, the resulting tertiary butyl vanadyl phthalocyanine can be converted to an infrared sensitive form by vapor treatments thereof. More specifically, the tertiary butyl vanadyl phthalocyanine dispersed in a resinous binder, such as a copolymer of vinylchloride and vinylacetate, is spin coated on a suitable substrate, such as a reflective glass substrate. Subsequently, the glass substrate is subjected to a vapor treatment by causing an effective amount of vapors to contact the substrate, for a period of from about 1 to about 72 hours and preferably for a period of from about 5 to about 30 hours. Illustrative examples of substances selected for the vapor treatment include alkyl acetates, such as ethyl acetate, chloroform, tetrahydrofuran, methylethyl ketones, methylene chloride, ethylene chloride and the like. Other similar substances can be selected providing the objectives of the present invention are accomplished. The preferred material for vapor treatment is ethyl acetate.

Illustrative examples of suitable binder materials include polystyrenes, polyesters, polyacrylates, polymethacrylates, polycarbonates, polyamines, polyvinyl alcohols, polyvinyl chlorides, copolymers of vinylchloride and vinylacetate, and the like. The preferred polymeric binder is comprised of a vinylchloride and vinylacetate copolymer, containing from about 80 to 85 percent of vinylchloride, and from about 15 to about 20 percent by weight of vinylacetate, which copolymer is commercially available from Scientific Polymer Products. Another preferred polymeric binder is polystyrene.

The tertiary butyl vanadyl phthalocyanines are present in the polymeric binder in various amounts. Generally, however, these compositions, are present in an amount of from about 1 percent by weight to about 60 percent by weight, and preferably in an amount of from about 10 percent by weight to about 40 percent by weight. Accordingly, in this embodiment, the polymeric binder is present in an amount of from about 40 percent by weight to about 99 percent by weight, and preferably in an amount of from about 60 percent by weight to about 90 percent by weight.

The naphthocyanine compositions are present in the polymeric binder in various suitable amounts, generally however, these compositions are present in an amount of from about 1 percent by weight to about 60 percent by weight, and preferably in an amount of from about 10 percent by weight to about 40 percent by weight. Accordingly, in this embodiment, the polymeric binder is present in an amount of from about 40 percent by weight to about 99 percent by weight, and preferably is present in an amount of from about 60 percent by weight to about 90 percent by weight.

The particle size diameter of the phthalocyanine or naphthalocyanine compositions dispersed in the polymeric resinous binder is, for example, from about 0.005 microns to about 0.1 microns, and preferably the dimeter of these compositions is below 0.1 microns. The size of the phthalocyanine dye particles can be of importance in that, for example, large particles tend to scatter light and thus can subsequently decrease the write sensitivity and read-out contrast of the ablative optical recording members containing the tertiary butyl vanadyl phthalocyanines or naphthalocyanine materials.

Illustrative ablative infrared sensitive optical recording devices containing the tertiary butyl vanadyl phthalocyanine compositions or naphthalocyanine compositions described herein include those comprised of a substrate, such as glass or polymethylmethacrylate, containing thereover a reflective layer, such as aluminum, followed by the tertiary butyl vanadyl phthalocyanine or naphthalocyanine of the present invention, dispersed in a polymeric binder composition. As further layers there can be included a polymeric overcoating layer of materials such as polyisobutylene or polydimethylsiloxane, and a top overcoating dust protective layer containing polymeric substances such as polymethylmethacrylate.

The supporting substrate has a thickness of from about 1 to about 2 millimeters, while the reflective layer is of a thickness of from about 0.03 microns to about 0.1 microns. The light absorbing layers comprised of tertiary butyl vanadyl phthalocyanine or naphthalocyanine, dispersed in the resinous binder, are of a thickness ranging from about 0.06 microns to about 0.2 microns, while the polymeric overcoating layer is of a thickness of from about 0.06 microns to about 0.2 microns, and the dust protective top overcoating layer is of a thickness of from about 1 millimeter to about 2 millimeters.

The optical recording devices can be prepared by solvent-coating processes as the tertiary butyl vanadyl phthalocyanines and the naphthalocyanine materials selected for one of the layers are solubilizable primarily in view of the presence of the R groupings. More specifically, for example, one ablative optical recording member can be prepared by forming a solution of 1,1,2-trichloroethane containing the tertiary butyl vanadyl phthalocyanine, containing an average of 1.4 tertiary butyl groups, and the polymeric resinous binder of vinylchloride and vinylacetate. This solution is then filtered through a Millipore filter followed by spin coating on a aluminized glass substrate at a spin rate of about 1,000 revolutions per minute. An approximately 0.1 micron thick, optically clear thin film results. As indicated hereinbefore, the tertiary butyl vanadyl phthalocyanine selected is that phthalocyanine that has been vapor treated in order to effect recrystallization and reorientation of the particles of vanadyl phthalocyanine so as to enable them to be infrared absorbing, this recrystallization being accomplished by exposing the tertiary butyl vanadyl phthalocyanine to, for example, ethyl acetate vapor. Subsequently, the above devices can then be overcoated with a polymeric overcoating layer, followed by a top overcoating of a dust protective layer containing polymeric substances such as polymethylmethacrylate.

Information can be recorded on the ablative optical recording mediums by exposing the device to modulated laser light, of a wavelength ranging from about 750 nanometers to about 900 or more nanometers, which can be focused through the substrate, or is focused directly on the recording layer. As a result of this exposure, pits, holes or recessed areas, are formed in the exposed areas, the size of the holes being dependent on the energy of the laser beam selected. The formation of the holes or pits in the recording phthalocyanine or naphthalocyanine binder layer is primarily caused by the light absorbing characteristics of the infrared-absorbing dyes selected such that the light absorbed results in the generation of thermal energy, which is transferred to the polymeric binder resulting in the formation of the pits desired. These pits or holes are of small dimensions with diameters ranging from about 0.2 microns to about 5 microns, and preferably with a diameter ranging from about 0.5 microns to 2 microns.

The energy source selected is one capable of operating at lower electrical input power levels than, for example, argon, and helium cadmium lasers, such as those required by solid state injection lasers. These lasers which function between about 750 nanometers, and 850 nanometers, include, for example, gallium aluminum arsenide laser devices commercially available. It is, of course, to be appreciated that any suitable laser device can be selected providing it emits wavelengths of light in the infrared region, that is, ranging from about 750 nanometers to 900 nanometers, or more. It is important that the lasers selected such as gallium aluminum arsenide lasers indicated generate energy of the wavelength frequency that will be absorbed by the phthalocyanine binder layers of the devices of the present invention; and further, the energy being emitted must ablate or melt the phthalocyanine binder layers in order to form holes, and to provide a signal pattern having a signal-to-noise ratio of at least about 20 decibels. The lasers thus useful with the recording device of the present invention are highly suitable in comparison to argon and helium cadmium lasers, for example, which are bulky devices that require a comparatively large amount of electrical input power to operate. In addition, with the argon and helium cadmium lasers, an external light modulator is required. Thus, the optical recording devices of the present invention are useful with lasers that are simple in design, and economically attractive.

The lasers selected such as the aluminum gallium arsenide lasers generally have a power of from about 1 to 50 milliwatts, and usually are activated for a period of from about 1 nanosecond to about 1 microsecond. In one preferred embodiment, a gallium aluminum arsenide laser is selected which has a power of 15 to 25 milliwatts, and an emission wavelength of 800 nanometers, and wherein a series of 50 to 100 nanosecond light pulses are continuously injected into the ablative optical recording medium or device of the present invention.

Other advantages of ablative optical recording devices containing the tertiary butyl vanadyl phthalocyanine, and naphthalocyanine dyes, dispersed in the polymeric resinous binder materials include the provision of a low cost economical process for preparing such devices in that the phthalocyanine and naphthalamine compositions selected are solvent coatable. Additionally, the resulting devices are of high stability, allowing them to be used for archival storage purposes.

There is illustrated in FIG. 1 the absorption spectra for tertiary butyl vanadyl phthalocyanine prepared in accordance with Example I, process 1, of the present application, curve A representing the spectra for the tertiary butyl vanadyl phthalocyanine which is untreated, while curve B represents the spectra for tertiary butyl vanadyl phthalocyanine which has been subjected to a vapor treatment as indicated herein. More specifically, with regard to FIG. 1, there is represented on the Y axis the optical density number, while the X axis represents the wavelength in nanometers. Curves A and B illustrate the absorption spectrum of untreated and vapor treated tertiary butyl vanadyl phthalocyanine, dispersed in a copolymer of vinyl chloride vinyl acetate, 83 percent by weight of vinyl chloride, and 17 percent by weight of vinyl acetate, the tertiary butyl phthalocyaines being present in an amount of about 30 percent by weight. Curve B represents the absorption spectra for the tertiary butyl vanadyl phthalocyanine subsequent to treatment with vapors of ethyl acetate. As can readily be observed from the absorption curves, the untreated tertiary butyl vanadyl phthalocyanine has substantially no sensitivity in the infrared region of the spectrum, that is, beyond 800 nanometers, while the vapor treated tertiary butyl vandyl phthalocyaine has significant infrared sensitivity, that is a sensitivity in the wavelength region of from 800 to 900 nanometers, with maximum sensitivity occurring at about 825 nanometers.

The invention will now be described in detail with respect to specific preferred embodiments thereof, it being understood that these examples are intended to be illustrative only, and that the invention is not intended to be limited to the materials, conditions, process parameters and the like, recited herein. All parts and percentages are by weight unless otherwise indicated.

EXAMPLE I

This example describes the preparation of tertiary butyl substituted vanadyl phthalocyanines containing an average of 1.4 tertiary butyl groups.

In one preparation sequence, process 1, a mixture of 4-tertiarybutyl phthalonitrile 4.0 grams, phthalonitrile 30 grams and vanadium trichloride 50 grams was heated to approximately 240° C. for 2 to 4 hours. The resulting blue solid was boiled successively with a 5 percent aqueous hydrochloric acid solution, and a 5 percent sodium hydroxide aqueous solution. The soluble component containing a mixture of tertiary butyl vanadyl phthalocyanine was then extracted with methylene chloride and purified by column chromatography (on $Al_2O_3$) using chloroform as solvent, resulting in purple-reflective blue product crystals 5.4 grams (53 percent yield based on 4-tertiary-butyl phthalonitrile).

In a second preparation embodiment, a mixture of 4-tertiary-butyl phthalonitrile 1.4 grams, phthalonitrile 10.4 grams and vanadium pentoxide 1.3 grams in 35 millileters of ethylene glycol was heated to reflux for 4 hours. The resulting composition containing a mixture of tertiary butyl vanadyl phthalocyanine was filtered, then boiled with a 1 percent sodium hydroxide solution. The product was then isolated and purified as above, resulting in 0.75 grams of (tertiary butyl) 1.4 vanadyl phthalocyanine (21 percent yield based on 4-tertiary-butyl phthalonitrile).

Carbon, hydrogen and nitrogen elemental analysis, as well as NMR spectroscopy confirmed that with the above preparation methods, tertiary butyl, 1.4, vanadyl pthalocyaine was obtained.

EXAMPLE II

An ablative optical recording composition was prepared by first filtering a solution containing two milliliters of 1,1,2-trichloroethane, having dissolved therein 12 milligrams of the tertiary butyl substituted vanadyl phthalocyanine, prepared in accordance with Example I, process 1, and 28 milligrams of a vinylchloride-vinylacetate copolymer, containing 83 percent by weight of vinylchloride, and 17 percent by weight of vinylacetate, through a 1 micron Millipore filter followed by spin coating the resulting mixture onto a 2"×2" aluminized glass substrate, at a spinning rate of 1,000 revolutions per minute. An approximately 0.1 micron thick optically clear thin film was obtained. This film contained 70 percent by weight of the vinylchloride-vinylacetate copolymer and 30 percent by weight of the dye tertiary butyl vanadyl phthalocyanine. Subsequent to spin coating the resulting film had a reflectivity of about 60 percent at a wavelength of 800 nanometers. This film was then exposed to ethyl acetate vapor, for a period of about 60 hours, and the reflectivity of the resulting film at 800 nanometers decreases from about 60 percent to about 19 percent after the vapor treatment as determined by reflectance measurement on a Cary 17 Spectrophotometer.

For the purpose of determining the threshold sensitivity, the above prepared device, subsequent to treatment with ethylacetate vapor, was subjected to an infrared light pulse emitted by a nitrogen pumped dye laser with a pulse width of 8 nanoseconds, and emitting wavelengths of 750 nanometers to 850 nanometers. The threshold sensitivity of this device was found to be similar to a 0.015 micron thick tellurium monolayer, on a polymethylmethacrylate substrate, under identical recording conditions. The threshold sensitivity writing energy for the tellurium monolayer was 0.3 nanojoules, ($10^{-9}$) with a gallium alluminum arsenic laser device.

EXAMPLE III

An optical recording composition was prepared by repeating the procedure of Example II with the exception that the solution filtered contained a mixture of 12 milligrams of tetra-tertiary-butyl vanadyl naphthalocyanine, and 48 milligrams of a polystyrene resinous binder available from Polysciences, dispersed in 1 milliliter of a 1,1,2-trichloroethane solvent. Tetra-tertiary butyl vanadyl naphthalocyanine selected was synthesized according to the procedure of E. J. Kovshev and E. A. Luk'yanets, Jh. Obshch. Khim, 42, 696 (1972). Subsequent to spin coating on a 2"×2" aluminized glass substrate, at a spinning rate of 2,500 revolutions per minute, there resulted a film of about 0.1 micron thickness. The film contained the tetratertiary butyl vanadyl naphthalocyanine, 20 percent by weight, dispersed in the polystyrene resinous binder, 80 percent by weight. The reflectivity of the resulting film at 800 nanometers was 12 percent as determined by a reflectance measurement on a Cary 17 spectrophotometer.

The threshold sensitivity of this device was determined by repeating the procedure of Example II and substantially similar results were obtained.

EXAMPLE IV

An ablative optical recording composition was prepared by repeating the procedure of Example III with the exception that the tetra-tertiary butyl vanadyl naphthalocyanine was dispersed in a resinous composition containing a copolymer of vinyl chloride and vinyl acetate, 83 percent by weight of vinyl chloride, and 17 percent by weight of vinyl acetate, the naphthalocyanine compound being present in an amount of about 20 percent by weight. The reflectivity of the resulting film at 800 nanometers was 21 percent as determined by reflectance measurement on a Cary 17 spectrophotometer.

The threshold sensitivity of the above prepared composition was determined by repeating the procedure of Example II and substantially similar results were obtained.

Athough the invention has been described herein with reference to specific preferred embodiments, it is not intended to be limited thereto, and other alternatives or equivalents are intended to be embraced by the claims that follow.

We claim:

1. An ablative infrared-sensitive optical recording composition containing as a component thereof a dispersion of a resinous binder and a vapor treated organic solvent soluble naphthalocyanine infrared absorbing additive of the following formula:

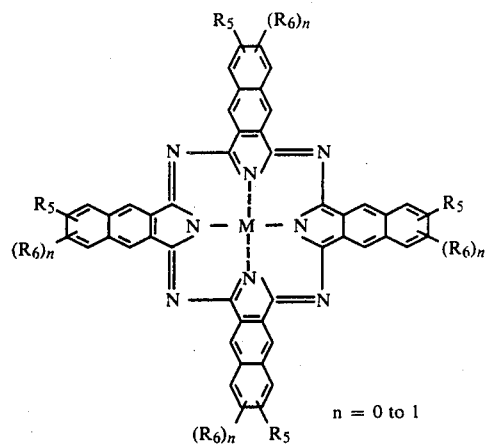

wherein $R_5$ and $R_6$ are alkyl groups of from 4 carbon atoms to 8 carbon atoms, M is a divalent metal complex, and n is a number of from 0 to 1, wherein said vapor treated organic solvent soluble naphthalocyanine infrared absorbing additive is of a diameter of from 0.005 microns to 0.1 microns.

2. An ablative optical recording composition in accordance with claim 1 wherein M is vanadium oxide.

3. An ablative optical recording composition in accordance with claim 1 wherein $R_5$ is tertiary butyl.

4. An ablative optical recording composition in accordance with claim 1 wherein $R_5$ and $R_6$ are tertiary butyl.

5. An ablative optical recording composition in accordance with claim 1 wherein the naphthalocyanine is tetra-tertiary butyl vanadyl naphthalocyamine.

6. An ablative optical recording composition in accordance with claim 1 wherein the resinous binders are polystyrene, polyesters, polycarbonates, polyvinylalcohol, polyvinylchloride, or copolymers of vinylchloride and vinylacetate.

7. An ablative optical recording composition in accordance with claim 6 wherein the resinous binder comprises a copolymer of a vinylchloride and vinylacetate, with the vinylacetate being present in an amount of from 80 percent by weight to 85 percent by weight and the vinylacetate being present in an amount of about 15 percent by weight to about 20 percent by weight.

8. An ablative optical recording composition in accordance with claim 1 wherein the naphthalocyanine is dispersed in the resinous binder in an amount of from 1 percent by weight to 60 percent by weight.

9. An ablative optical recording composition in accordance with claim 1 in the form of a layer wherein the thickness of said phthalocyanine layer is from 0.05 microns to 2 microns.

10. An ablative optical recording composition in accordance with claim 1 wherein the resinous dispersion forms a film on a reflective substrate.

11. A method of recording information wherein a layer of the ablative optical recording composition of claim 1 is exposed to an infrared laser beam modulated in accordance with the information desired, the laser beam having an emission wavelength of from about 750 nanometers to about 850 nanometers causing the formation of pits or holes in said layer, which holes or pits are capable of being read by means of laser light.

12. A method of recording information in accordance with claim 11 wherein the composition of the recording layer contains tetra-tertiary butyl vanadyl naphthalocyanine, dispersed in the resinous binder of a vinyl chloride vinyl acetate copolymer.

13. A method in accordance with claim 12 wherein the laser beam is emitted from a gallium aluminum arsenide laser device.

14. A method of imaging in accordance with claim 11 wherein M in the naphthalocyanine is vanadium oxide, and $R_5$ and $R_6$ are tertiary butyl groups.

15. An ablative infrared sensitive optical recording member in accordance with claim 1 wherein from 4 to 8 tertiary butyl groups are present on the organic solvent soluble naphthalocyanine infrared absorbing additive.

16. A method of recording information in accordance with claim 11 wherein the composition of the recording layer contains tetra-tertiary butyl vanadyl naphthalocyanine dispersed in the resinous binder of polystyrene.

* * * * *